Sept. 27, 1932. B. McELROY 1,879,375
GRAVE FORM
Filed Nov. 12, 1930
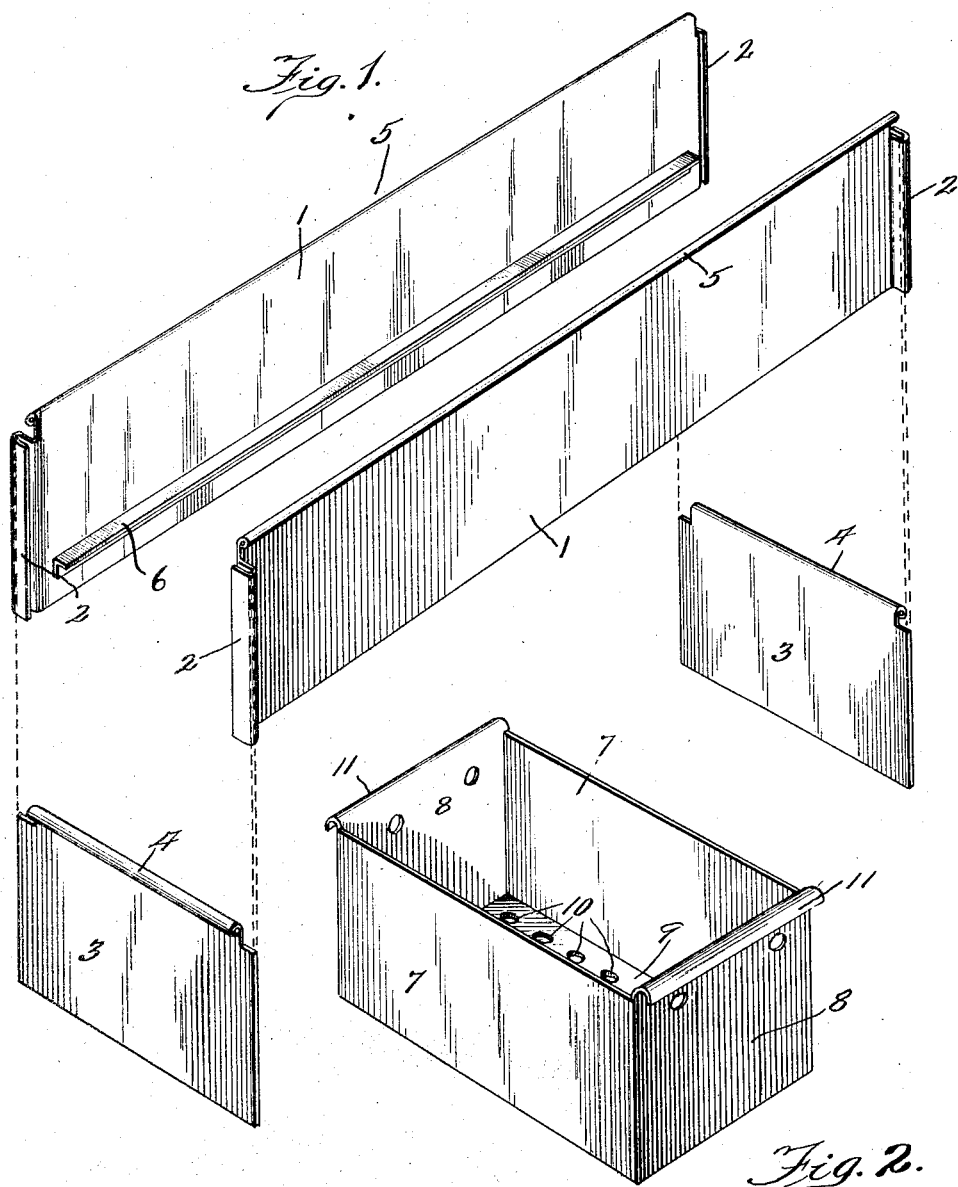
Inventor:
Bessie McElroy
By Arthur F. Durand
Atty.

Patented Sept. 27, 1932

1,879,375

UNITED STATES PATENT OFFICE

BESSIE McELROY, OF CHICAGO, ILLINOIS

GRAVE FORM

Application filed November 12, 1930. Serial No. 495,149.

This invention relates to flower or plant boxes, and more particularly to those of the kind shown and described in prior application No. 387,780, filed Aug. 22, 1929, for use more particularly on graves in cemeteries.

Generally stated, the object of the present improvements is to provide a novel construction whereby the box is of a knock-down construction, whereby it can be shipped flat, so to speak, or can be taken apart and stored when not in use.

It is also an object to provide certain details and features of construction and combinations tending to increase the general efficiency and the desirability of a flower or plant box of this particular character.

To these and other useful ends, the invention consists in matters hereinafter set forth and claimed and shown in the accompanying drawing, in which—

Fig. 1 is a perspective of the four different sections, the two side walls, and the two end walls, of the outside box or receptacle, of a flower or plant box structure embodying the principles of the invention; and Fig. 2 is a perspective of one of the smaller or inside boxes or compartments that are placed transversely in the said outside box.

As thus illustrated, the invention comprises a rectangular and flat-sided outside box comprising side walls 1, having vertical end guides 2, formed as shown.

Said outside box comprises the two end walls 3, having their upper edges provided with rolled portions or handles 4, as shown. Similar handles or rolled portions 5 are provided on the upper edges of the said side walls.

With this construction, the end walls 3 can be moved downwardly in the guides 2, to form the elongated and rectangular outer box, the side walls having inner ledges or shoulders 6 near their lower edges. This box will be sunk in the ground in the desired manner, but the box has no bottom, it will be seen, so that it is ventilated at the bottom with respect to both air and moisture.

The inside boxes, of the kind shown in Fig. 2, each consist of the side walls 7 and the end walls 8, and a bottom wall 9, the latter preferably having perforations 10 of any suitable character therein. This relatively small inside box has its end walls provided with handles 11, or rolled-over portions, that rest on the upper edge portions 5 of the side walls previously mentioned. In addition, the boxes 7, which are placed transversely in the larger outside box, can rest on the ledges 6 of the side walls of the outer box. Both supports can be used, or either one can be used without the other. The portions 11 will bind the side walls 1 against the ends 8 of the inner boxes.

Thus, when the complete structure is assembled, there is an outer box composed of the walls 1—1 and 3—3, and a plurality of transverse inner boxes of the kind shown in Fig. 2 of the drawing. The inner boxes may contain the flowers or plants, and each inner box can be taken out separately without disturbing the other inner boxes. In practice, these inner boxes can be carried into a greenhouse for the winter, and the outer box can be knocked down and stored flat. It is obvious, of course, that each inner box can have the same knock-down construction that the outer box has, if desired.

It will be understood, of course, that the various walls of the outer box, and of the inner box, may be made of sheet metal of any suitable or desired character.

What I claim as my invention is:

1. In a flower or plant box to be sunk in the ground, the combination of an outer box comprising longitudinal side walls and transverse end walls, that detachably connect together, forming a box with an open bottom, and transverse inside boxes supported side by side in said outside box, on said longitudinal side walls, said inside boxes having perforated bottoms exposed to the ground.

2. A structure as specified in claim 1, said side walls having the ends thereof provided with vertical guides to receive the said end walls.

3. A structure as specified in claim 1, said inside boxes having end walls provided at their upper edges with means to rest on the upper edges of the said detachable side walls of the outer box.

4. A structure as specified in claim 1, the detachable side walls having inner ledges or shoulders upon which the inner boxes are supported.

Specification signed this sixth day of November, 1930.

BESSIE McELROY.